(12) United States Patent
Cobb (10) Patent No.: US 7,614,154 B2
(45) Date of Patent: Nov. 10, 2009

(54) SYSTEM AND METHOD FOR LOCATING COMPONENTS OF A STRUCTURE

(75) Inventor: James M. Cobb, Burien, WA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 11/977,986

(22) Filed: Oct. 26, 2007

(65) Prior Publication Data

US 2009/0106988 A1    Apr. 30, 2009

(51) Int. Cl.
*G01B 11/26* (2006.01)
*G06F 19/00* (2006.01)

(52) U.S. Cl. .................. 33/1 BB; 33/1 CC; 33/286; 700/114; 356/615

(58) Field of Classification Search .............. 33/1 BB, 33/1 G, 1 CC; 700/114; 356/615
See application file for complete search history.

(56) References Cited

U.S. PATENT DOCUMENTS

| | | | | |
|---|---|---|---|---|
| 4,383,373 A | * | 5/1983 | Couturier | 33/286 |
| 4,483,080 A | * | 11/1984 | Knoll | 33/286 |
| 4,663,855 A | * | 5/1987 | Hamilton et al. | 33/288 |
| 4,691,446 A | * | 9/1987 | Pitches et al. | 33/516 |
| 5,452,516 A | * | 9/1995 | Schegerin | 33/1 MP |
| 5,757,499 A | * | 5/1998 | Eaton | 356/620 |
| 5,793,483 A | * | 8/1998 | Zehnpfennig et al. | 356/139.03 |
| 5,920,394 A | * | 7/1999 | Gelbart et al. | 356/615 |
| 6,452,668 B1 | | 9/2002 | Pratt | |
| 6,501,543 B2 | | 12/2002 | Hedges et al. | |
| 6,535,282 B2 | | 3/2003 | Hedges et al. | |
| 6,618,133 B2 | | 9/2003 | Hedges et al. | |
| 6,630,993 B1 | | 10/2003 | Hedges et al. | |
| 6,901,673 B1 | * | 6/2005 | Cobb et al. | 33/502 |
| 7,194,326 B2 | | 3/2007 | Cobb et al. | |
| 7,305,277 B2 | * | 12/2007 | Freeman et al. | 700/114 |
| 2005/0228613 A1 | * | 10/2005 | Fullerton et al. | 702/150 |

FOREIGN PATENT DOCUMENTS

| | | |
|---|---|---|
| EP | 0957335 | 11/1999 |
| FR | 2821778 | 9/2002 |
| WO | WO 94/28375 | 12/1994 |
| WO | WO 2007/101475 | 9/2007 |

OTHER PUBLICATIONS

International Search Report and Written Opinion of International Searching Authority, International Application No. PCT/US2008/078456, Jan. 28, 2009.

* cited by examiner

*Primary Examiner*—Christopher W Fulton
(74) *Attorney, Agent, or Firm*—Toler Law Group (57) ABSTRACT

In non-limiting, illustrative embodiments, methods, systems, and manufacturing facilities are provided for locating components of a structure. Locations of features of components of a structure are simultaneously determined. Relative positions of the components are determined in a coordinate system of the structure.

25 Claims, 11 Drawing Sheets

SYSTEM AND METHOD FOR LOCATING COMPONENTS OF A STRUCTURE

BACKGROUND

Components of large-scale structures, such as aircraft, ships, and the like, typically are aligned and assembled into the large-scale structures using rigid, permanently-mounted tooling to support, measure, move, and control alignment of the components. However, current measurement systems are part of the tooling. As such, the tooling must behave as a precise measurement tool. This precise measurement function of current tooling entails permanently mounting the tooling on concrete floors so the tooling is stable enough for use as a measurement tool. This precise measurement function also entails periodic calibration of the tooling with laboratory-grade measurement systems to ensure that the measurement capability is not degraded over time.

Also, current measurement systems, such as laser trackers, typically take multiple measurements sequentially over time to establish locations of multiple components in a single coordinate system. During this time, locations of the components may move due to environmental effects. Also, re-calibration of the measurement system may be entailed to account for environmental effects on the measurement system during this time.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be illustrative, not limiting in scope. In various embodiments, one or more of the problems described above in the Background have been reduced or eliminated, while other embodiments are directed to other improvements.

In non-limiting, illustrative embodiments, methods, systems, and manufacturing facilities are provided for locating components of a structure. Locations of features of components of a structure are simultaneously determined. Relative positions of the components are determined in a coordinate system of the structure.

According to an aspect, locations of transmitters in a constellation of transmitters are determined. For example, azimuth and elevation of the transmitters are determined relative to locations of reference targets that are arranged in an assembly area in predetermined positions that are known in a coordinate system of the assembly area. This enables determination of azimuth and elevation of component targets that are arranged on the components in predetermined positions that are known in the coordinate system of the structure relative to the locations of the transmitters. The azimuth and elevation can be converted into coordinates in the coordinate system of the structure.

According to other aspects, a measurement system is located separate from tooling. For example, the measurement system can be an infrared global positioning system, in which case the transmitters can be infrared transmitters, and the component targets and the reference targets can be infrared detectors. In another example, the measurement system can be a photogrammetry system including cameras, in which case the plurality of transmitters can be flash-emitting devices, with each of the flash-emitting devices being co-located with an associated camera and, the component targets and the reference targets can be passive reflectors.

In addition to the illustrative embodiments and aspects described above, further embodiments and aspects will become apparent by reference to the drawings and by study of the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

Figure 1A:
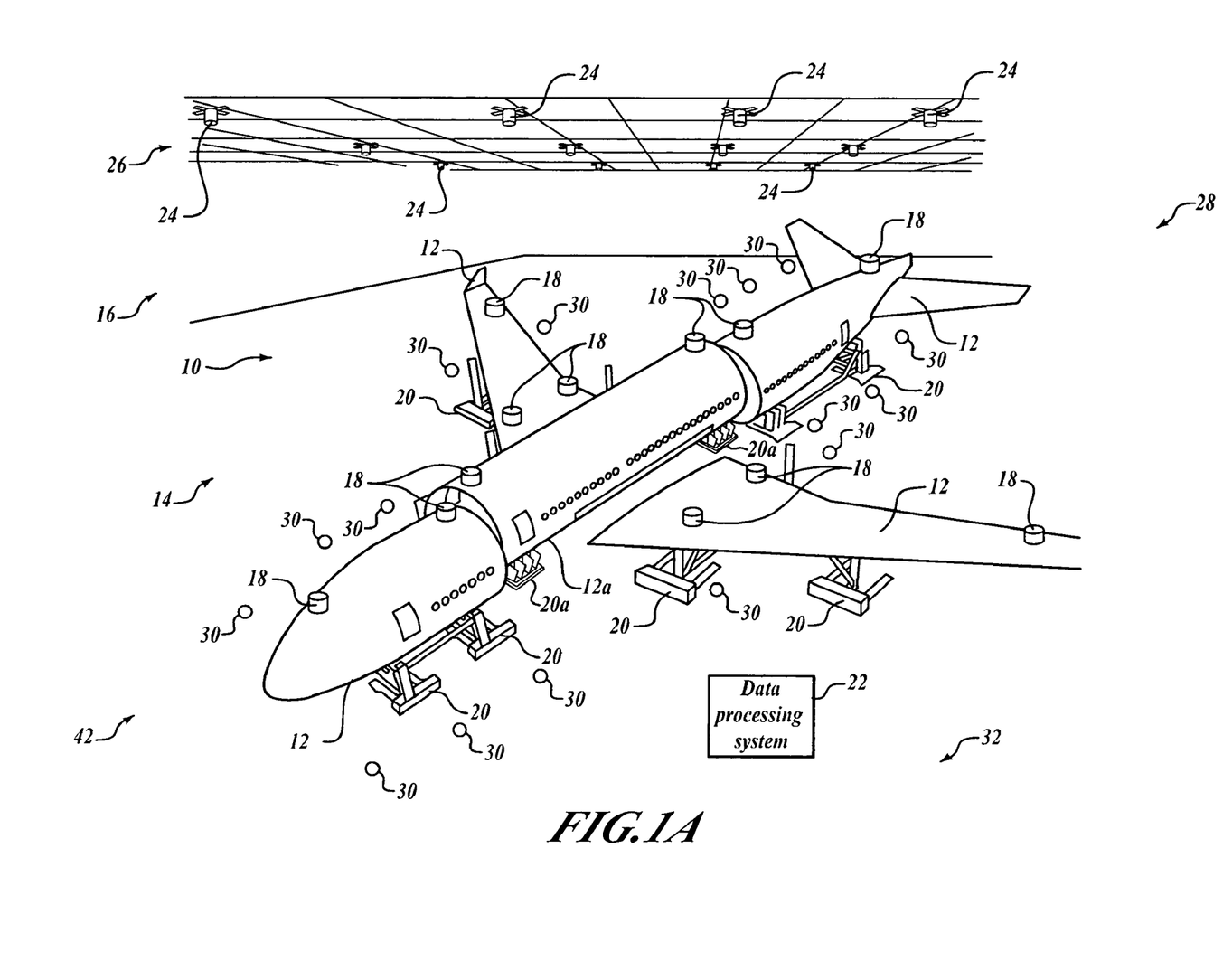
FIGS. 1A and 1B are perspective views in partial schematic form of an illustrative system for a locating components of a structure.
Figure 1B:
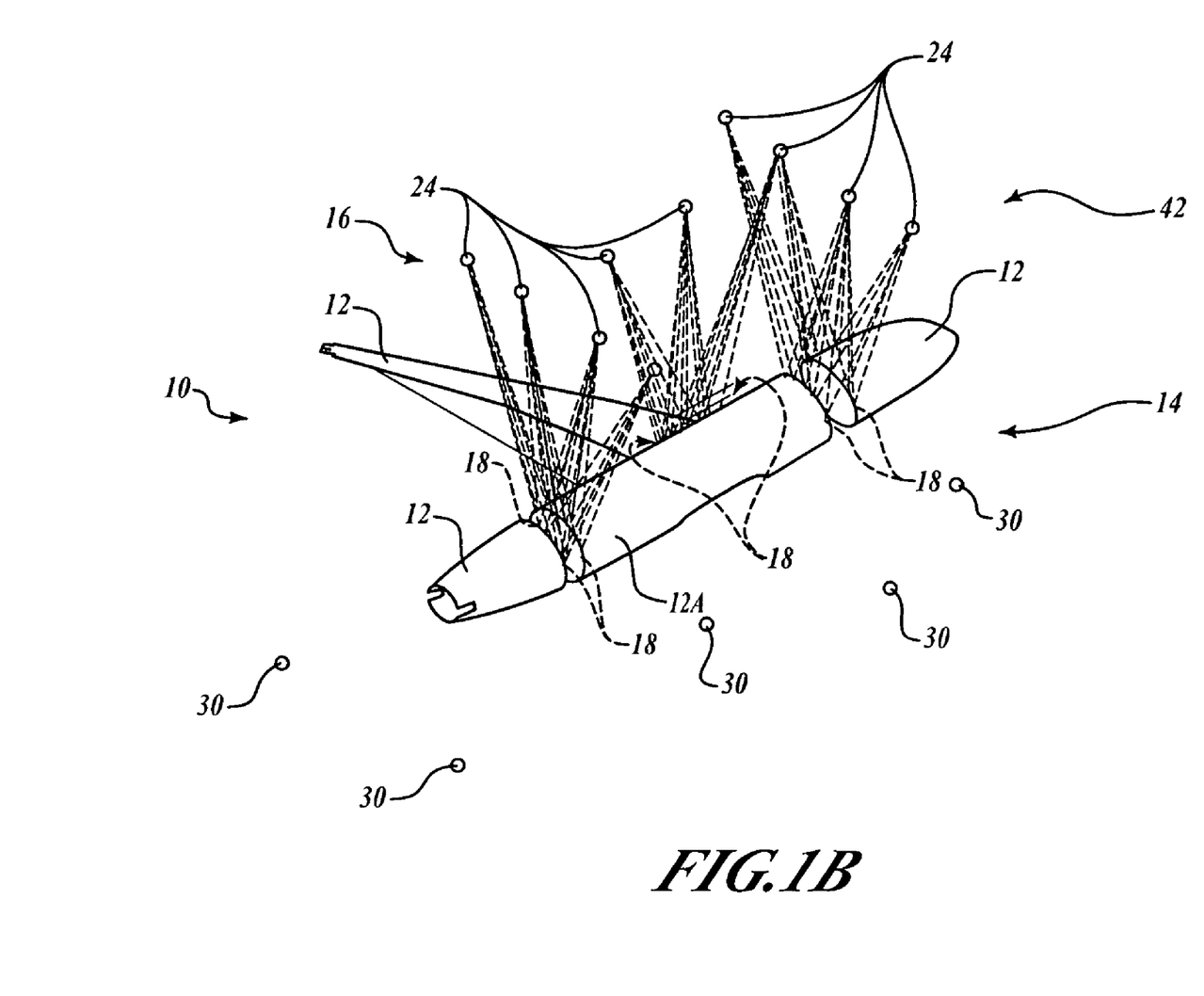
Figure 1C:
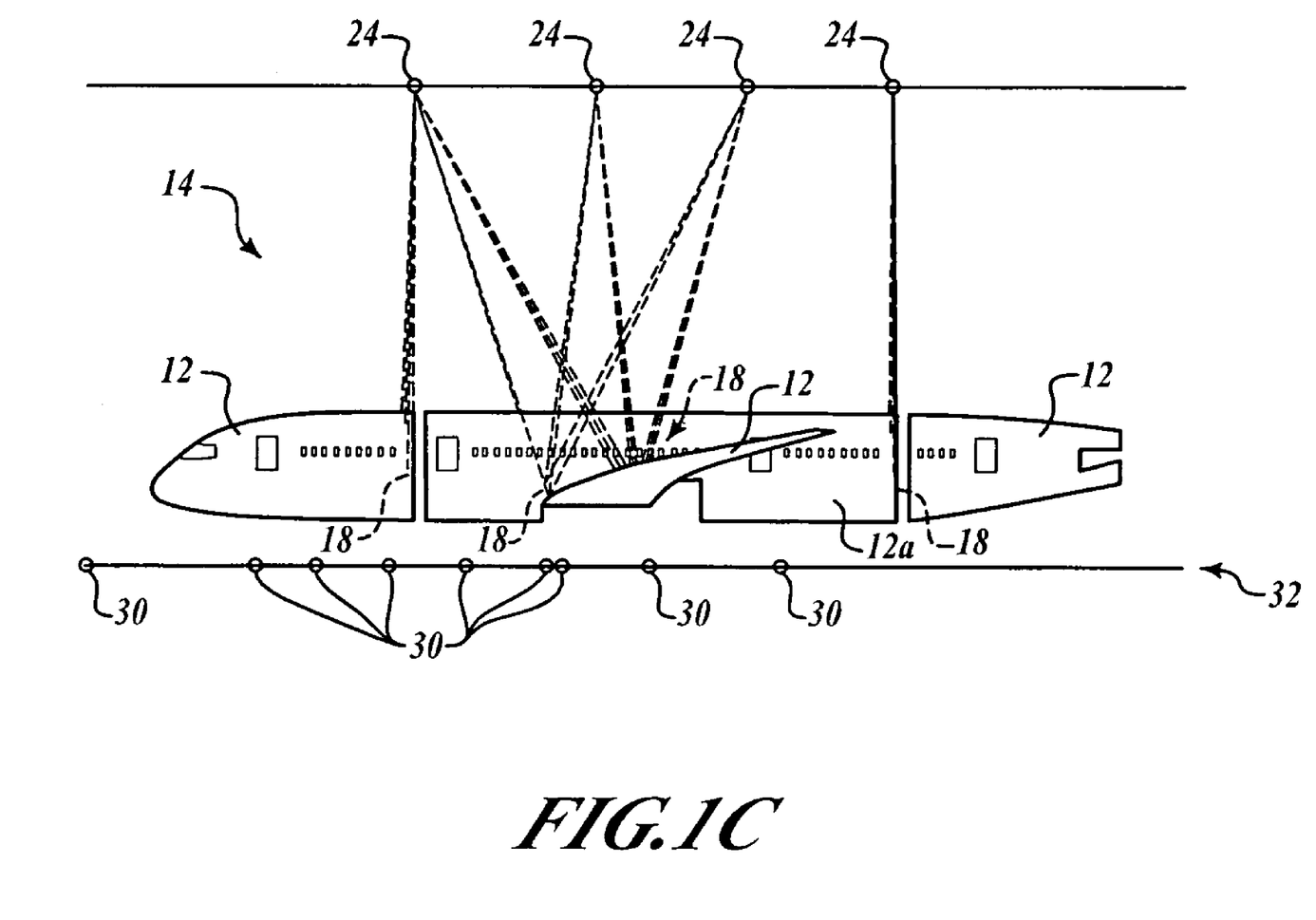
FIG. 1C is a side view in partial schematic form of the illustrative system of FIGS. 1A and 1B.

By way of overview and referring to FIGS. 1A, 1B, and 1C, a non-limiting, illustrative system 10 can locate components 12 of a structure 14. A measurement system 16 is configured to simultaneously determine locations of features 18 of the components 12 that are disposed in tooling 20. The measurement system 16 is located separate from the tooling 20. A data processing system 22 is configured to determine relative positions of the components 12 in a coordinate system of the structure 14. Details of illustrative embodiments will now be set forth below.

Still referring to FIGS. 1A, 1B, and 1C, the structure 14 is shown as a commercial aircraft for purposes of illustration only. In this non-limiting embodiment, the components 12 can be fuselage sections, wings, and the like. However, it will be appreciated that the structure 14 is not intended to be limited to commercial aircraft. The structure 14 can also be other kind of aircraft, such as without limitation any kind of civilian or military aircraft or spacecraft. Moreover, the structure 14 is not intended to the limited to aircraft or spacecraft. For example, the structure 14 can be other types of vehicles, such as land vehicles like automobiles, trucks, recreational vehicles, and the like, and maritime vessels such as ships and submarines. Moreover, the structure 14 could also be stationary structures, such as buildings of any type. Thus, the structure 14 is not intended to be limited. To that end, the structure 14 can be any kind of structure that entails accurate assembly of components.

The structure 14 defines its own coordinate system. In one illustrative embodiment, the components 12 each define holes (not shown) in predetermined locations that have known coordinates in the coordinate system of the structure 14.

Given by way of example and not of limitation, the holes (not shown) can be determinant assembly holes defined in the components 12, such as fuselage sections and wings.

The components 12 are disposed in the tooling 20. In one illustrative embodiment, one of the components 12A may be a central fuselage section of an aircraft that is rigidly supported in place on tooling 20A. That is, the central fuselage section is stationary and remains fixed in place on tooling 20A that is stationary and remains fixed in place. The other tooling 20 is movable such that the components 12 can be moved to the component 12A. In this embodiment, the structure 14 is assembled by moving the components 12 to the component 12A. In some other embodiments, one of the components that can be located includes a gyroscope (that is mounted on movable tooling in the assembly area) which will be re-located inside a vehicle, such as an aircraft.

Figure 2A:
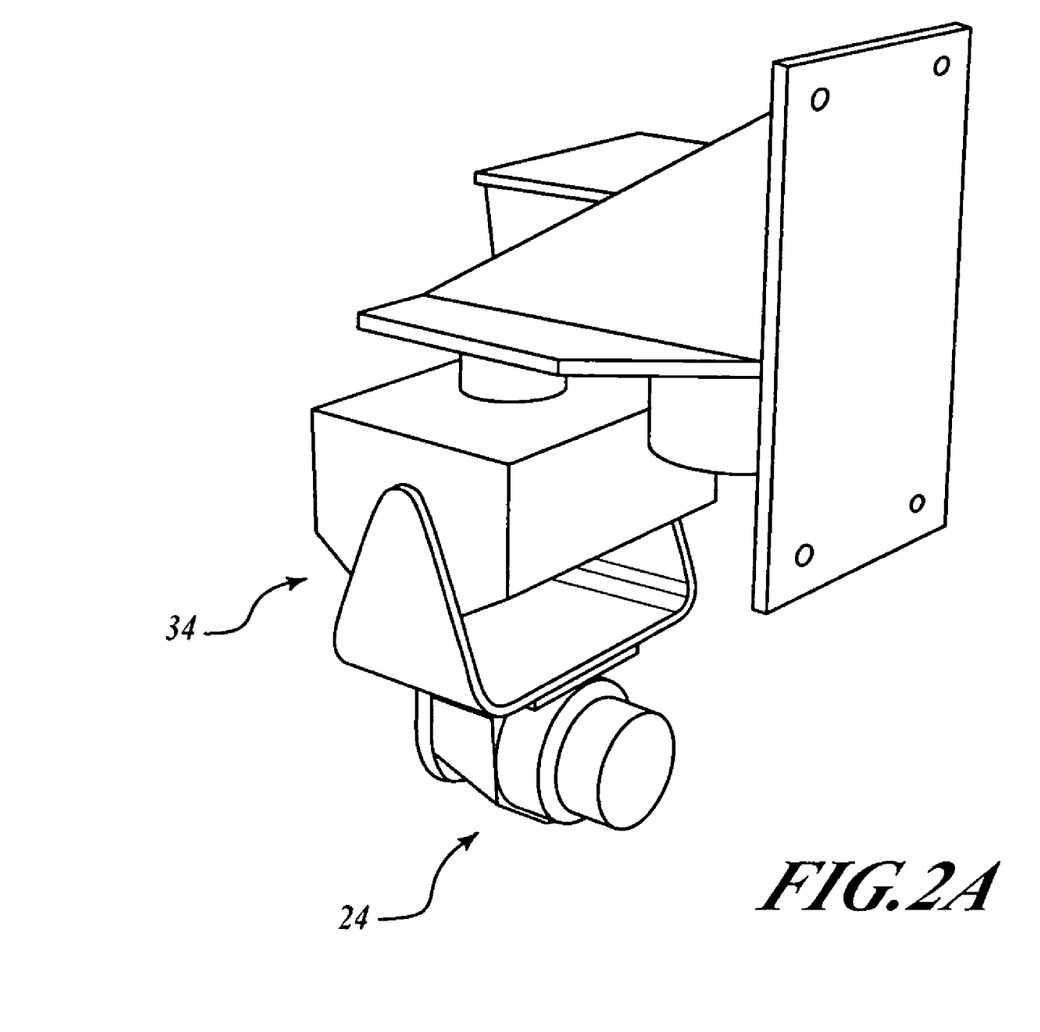
FIG. 2A is a perspective view of an illustrative transmitter of the system of FIGS. 1A, 1B, and 1C.

Referring additionally to FIG. 2A, the measurement system 16 includes a constellation of transmitters 24 that are mounted toward a roof 26 of a manufacturing facility 28. Positions of the transmitters 24 are determined by triangulation relative to reference targets 30 that are placed in a floor 32 of an assembly area 42, such as a work cell, of the manufacturing facility 28 in predetermined positions that are known in a coordinate system of the assembly area 42. Once the position of the transmitters 24 is known, positions of the features 18, such as targets, can be determined relative to the position of the transmitters 24.

In one illustrative embodiment, the measurement system 16 suitably is an indoor global positioning system or infrared global positioning system (both referred to herein as IGPS). Suitable IGPS components and systems are available from Metris USA of Dulles, Va. In such an embodiment, the transmitters 24 are infrared transmitters. Each of the transmitters 24 has a footprint (not shown) on the floor 32 that is nominally an "hourglass" shape. The transmitters 24 and the targets 18 on the components 12 are placed such that the transmitters 24 have unimpeded line-of-sight to the targets 18 on the components 12. Moreover, each target 18 should "see" at least four transmitters 24. Further, some of the transmitters 24 can serve multiple measurements zones. Thus, locations of the transmitters 24 can be selected to be optimized for certain targets 18 or groups of targets 18.

The transmitters 24 are mounted toward the roof 26 and articulating mount 34. Each articulating mount 34 provides a capability to articulate the transmitter 24 mounted thereon in azimuth and elevation to optimize measurement geometry and to aim the transmitters 24 to areas of interest as desired. Also, articulation permits each of the transmitters 24 to be swept in azimuth and elevation while it transmits optical energy.

Figure 2B:
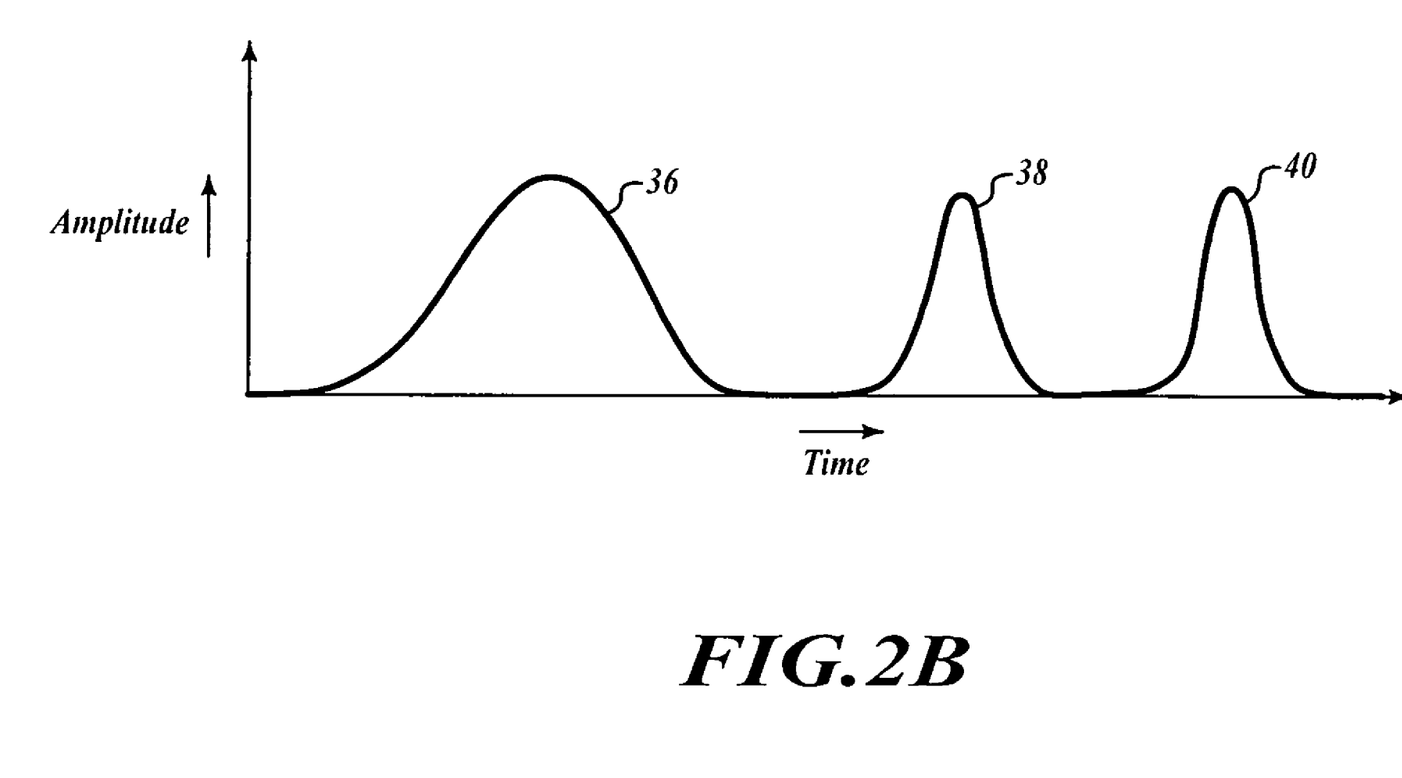
FIG. 2B illustrates signals produced by the transmitter of FIG. 2A.

Referring additionally to FIG. 2B, in one embodiment the transmitter 24 produces a strobe 36 followed by a pulse 38 and a pulse 40 while the transmitter 24 is swept in azimuth and elevation. A time difference between detection of the pulse 38 and the pulse 40 at the targets 18 or the reference targets 30 corresponds to elevation. A time difference between detection of the strobe 36 and an average of the pulses 38 and 40 at the targets 18 and the reference targets 30 corresponds to azimuth.

Referring back to FIGS. 1A, 1B, and 1C, the reference targets 30 provide reference locations for the measurement system 16. The reference targets 30 are used to determine locations and orientations of the transmitters 24 and to provide a distance scale for the measurement system 16. The reference targets 30 can also be used to subtract any motion of the transmitters 24, such as motion due to vibrations of the manufacturing facility 28, from the measurement environment in real time. In addition, buildings can also move from solar/thermal changes and from wind loading.

The reference targets 30 are linked to the coordinate system of the assembly area 42. That is, the reference targets 30 are placed in predetermined locations that are known in the coordinate system of the assembly area 42. The coordinate system of the assembly area 42 typically closely approximates the coordinate system of the structure 14 (although such close approximation is not required). Additionally, distances are known between all of the reference targets 30. Thus, the reference targets 30 also provide a distance scale for the measurement system 16.

The reference targets 30 are placed in or on the floor 32 of the manufacturing facility 28 about to the components 12 to enclose the assembly area 42. If desired, the reference targets 30 and the floor 32 can incorporate features, such as male and female members, to help ensure accurate and repeatable placement of the reference targets 30. Additionally, the reference targets 30 are placed such that each of the transmitters 24 "sees" at least four of the reference targets 30. Some of the reference targets 30 can serve multiple measurements zones.

Each of the reference targets 30 can be an active target, Such as an infrared (IR) detector. The reference targets 30 thus acts like a photocell and generates a signal in response to detection of the strobe 36, the pulse 38, and the pulse 40. IR detectors are known in the art, and a discussion of their construction and operation is not necessary for an understanding.

Figure 3:
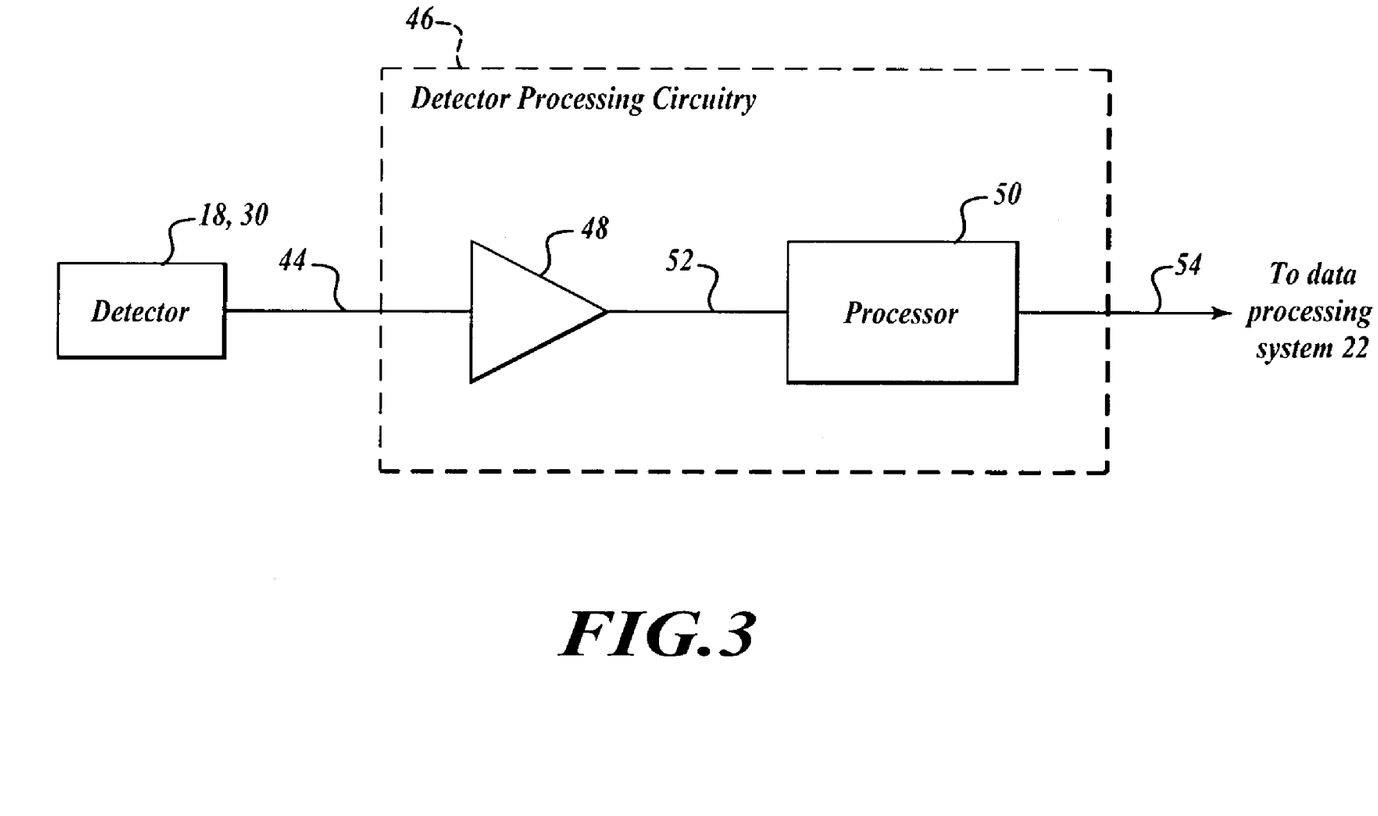
FIG. 3 is a block diagram of illustrative detector processing circuitry.

Referring now to FIG. 3, when embodied as an IR detector each of the targets 18 and the reference targets 30 generates an analog signal 44 indicative of the strobe 36, the pulse 38, and the pulse 40. Each target 18 and reference target 30 is coupled to provide its analog signal 44 to detector processing circuitry 46 associated with the target 18 or the reference target 30, as the case may be.

Each detector processing circuitry 46 includes a differential amplifier 48 and a processor 50. The differential amplifier 48 receives the analog signal 44, amplifies the analog signal 44, and outputs an amplified analog signal 52. The differential amplifier 48 may be any suitable differential amplifier known in the art.

The processor 50 receives the amplified analog signal 52 from the differential amplifier 48. The processor 52 performs an analog-to-digital (A/D) conversion of the amplified analog signal 52, processes the digitized signal to extract timing information, and converts the timing information into azimuth and elevation angles as described above. The processor 50 outputs to the data processing system 22 a digital signal 54 indicative of the azimuth and elevation information. The processor 50 may be any processor known in the art, such as without limitation a Metris indoor GPS position calculation engine part number 200831.

Referring now to FIGS. 1A, 1B, 1C, 4A, and 4C, the features 18 that are located by the measurement system 16 suitably are embodied as active targets, such as IR detectors. Like the reference target 30 and referring additionally to FIG. 2B, the target 18 also acts like a photocell and generates a signal in response to detection of the strobe 36, the pulse 38, and the pulse 40. IR detectors are known in the art, and a discussion of their construction and operation is not necessary for an understanding. As discussed above, each target 18 is coupled to provide its analog signal 44 to detector processing circuitry 46 associated with the target 18.

Figure 4A:
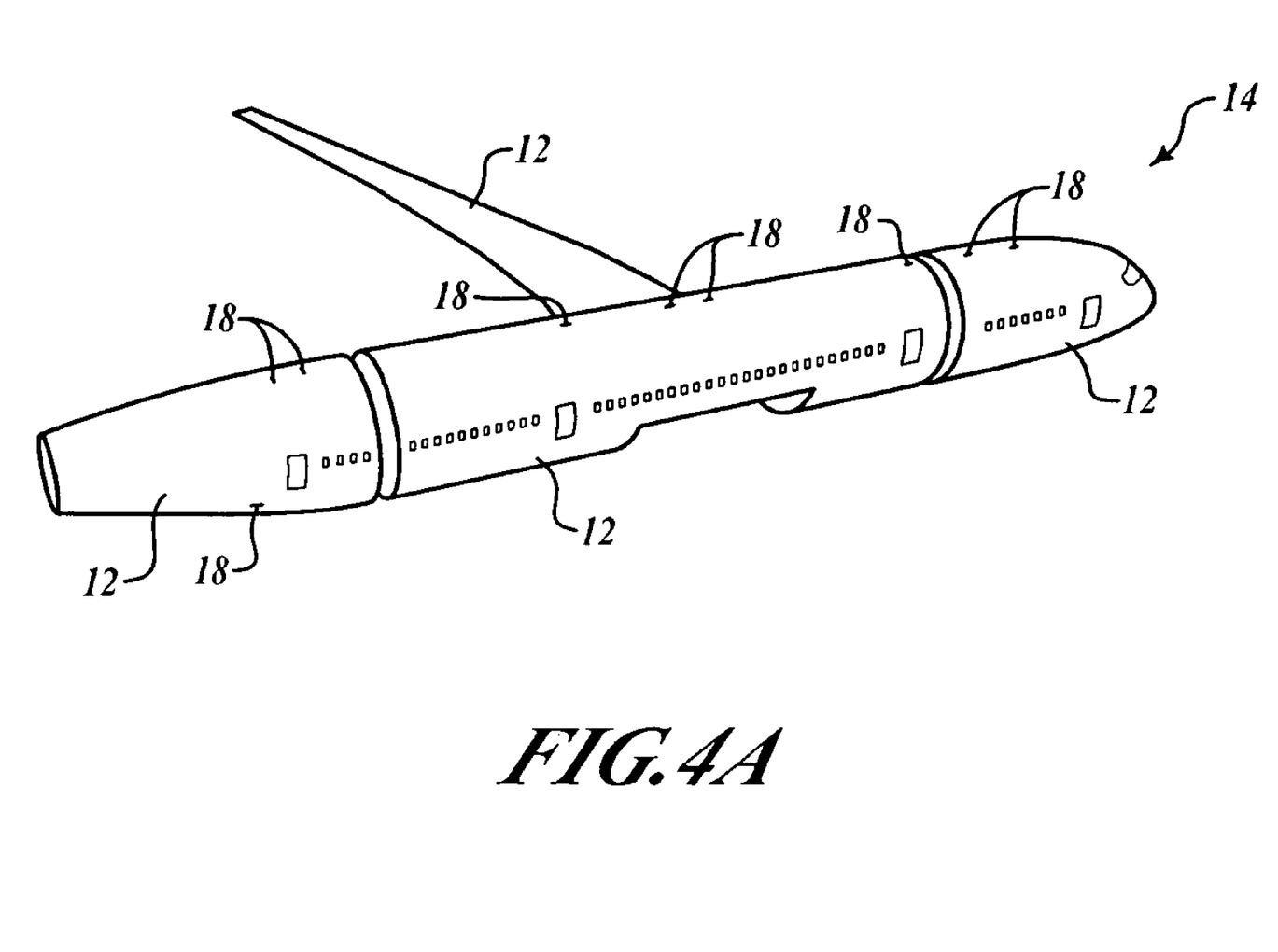
FIG. 4A is a perspective view of components of a structure and detectors disposed thereabout.
Figure 4B:
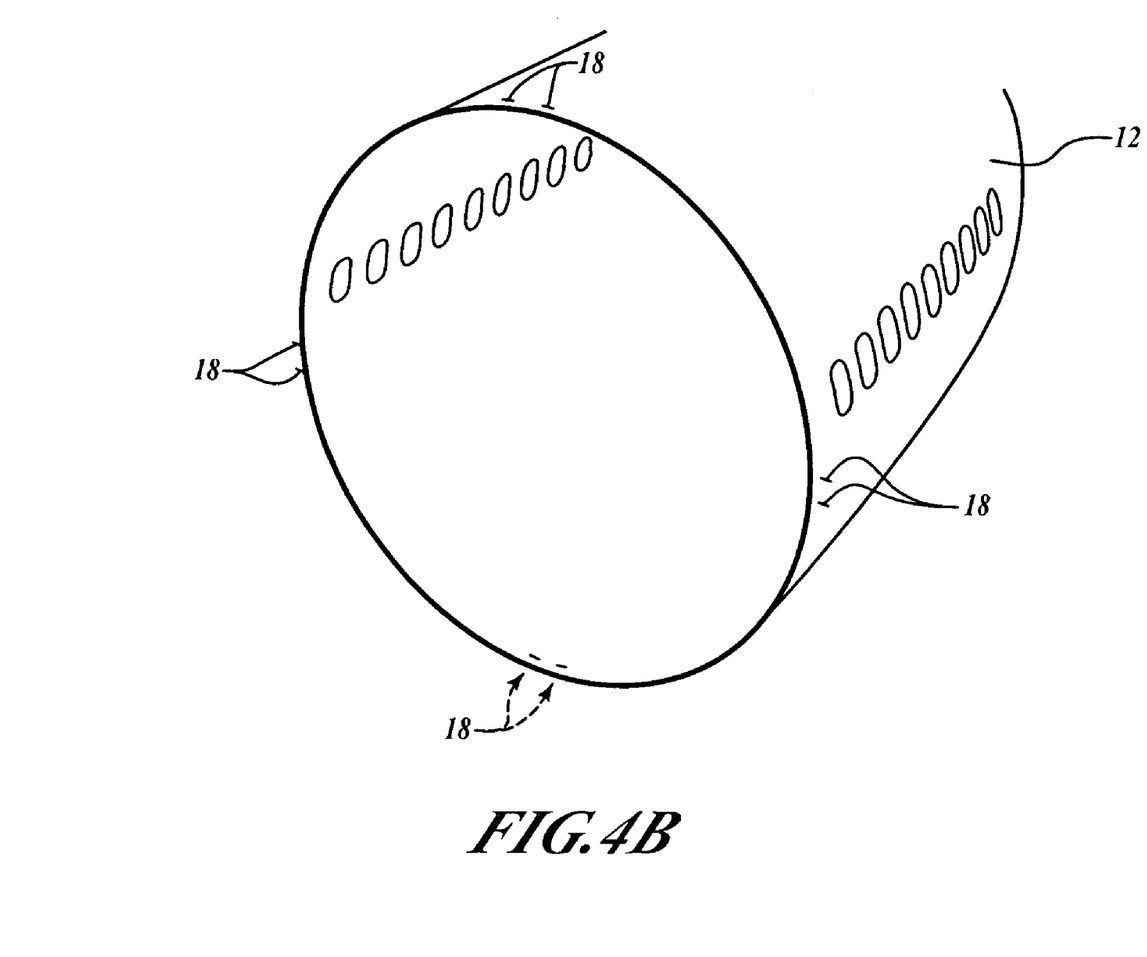
FIG. 4B is a perspective view of details of one of the components and detectors disposed thereabout of FIG. 4A.

The targets 18 are disposed about the components 12 in predetermined locations that are known according to the coordinate system of the structure 14. In one non-limiting embodiment, the components 12 are components of an aircraft and have multiple holes, referred to as determinant assembly holes, that are defined in predetermined locations. Thus, in some embodiments, the targets 18 are placed in predetermined locations as desired by being placed in determinant assembly holes.

One or more of the targets 18 can be placed at any location on the component 12 to yield location information, such as ultimately defining a slip plane, as desired. For example, placement of one target 18 at one location on the component 12 can yield location information regarding a point in space. When three of the targets 18 are used on the component 12, six degrees of freedom can be measured. That is, the location of component 12 in space is known while the component 12 can be laterally translated three ways and can be twisted three ways. Placement of two of the targets 18 at any location on the component 12 can yield location information regarding a line (five degrees of freedom are known). The position of the component 12 can be located as it moves in space with exception of any rotation of the component 12 about the line itself.

Referring now to FIGS. 1A and 3, the detector processing circuitry 46 and the data processing system 22 are operatively coupled by wires, cables, or wireless coupling members, as desired. The data processing system 22 includes one or more computer processors, microprocessors, and the like, as desired, for determining relative positions of the components 12 in the coordinate system of the structure 14, such as by converting azimuth and elevation information in the coordinate system of the assembly area 42 received via the signals 54 into coordinates in the coordinate system of the structure 14.

In some other embodiments, the measurement system 16 can be a photogrammetry system. In such embodiments, the transmitters 24 include flash-emitting devices. The flash-emitting devices generate the strobe 36, the pulse 38, and the pulse 40. The targets 18 and the reference targets 30 are passive reflectors that reflect the strobe 36, the pulse 38, and the pulse 40 back toward the flash-emitting device. A camera, such as a digital camera like a charge-coupled device (CCD) camera, that is associated with the flash-emitting device is co-located with the flash-emitting device. The camera outputs the signal 44 to the processing circuitry 46. Other details remain the same and the not be repeated.

Referring additionally now to FIGS. 5A-5D, a method 60 for locating components of a structure begins at a block 62. At a block 64, locations of components of a structure are simultaneously determined. In a block 66, relative positions of the components are determined in a coordinate system of the structure. The method 60 stops at a block 68. Details of processing blocks of the method 60 will be discussed below.

Figure 5A:
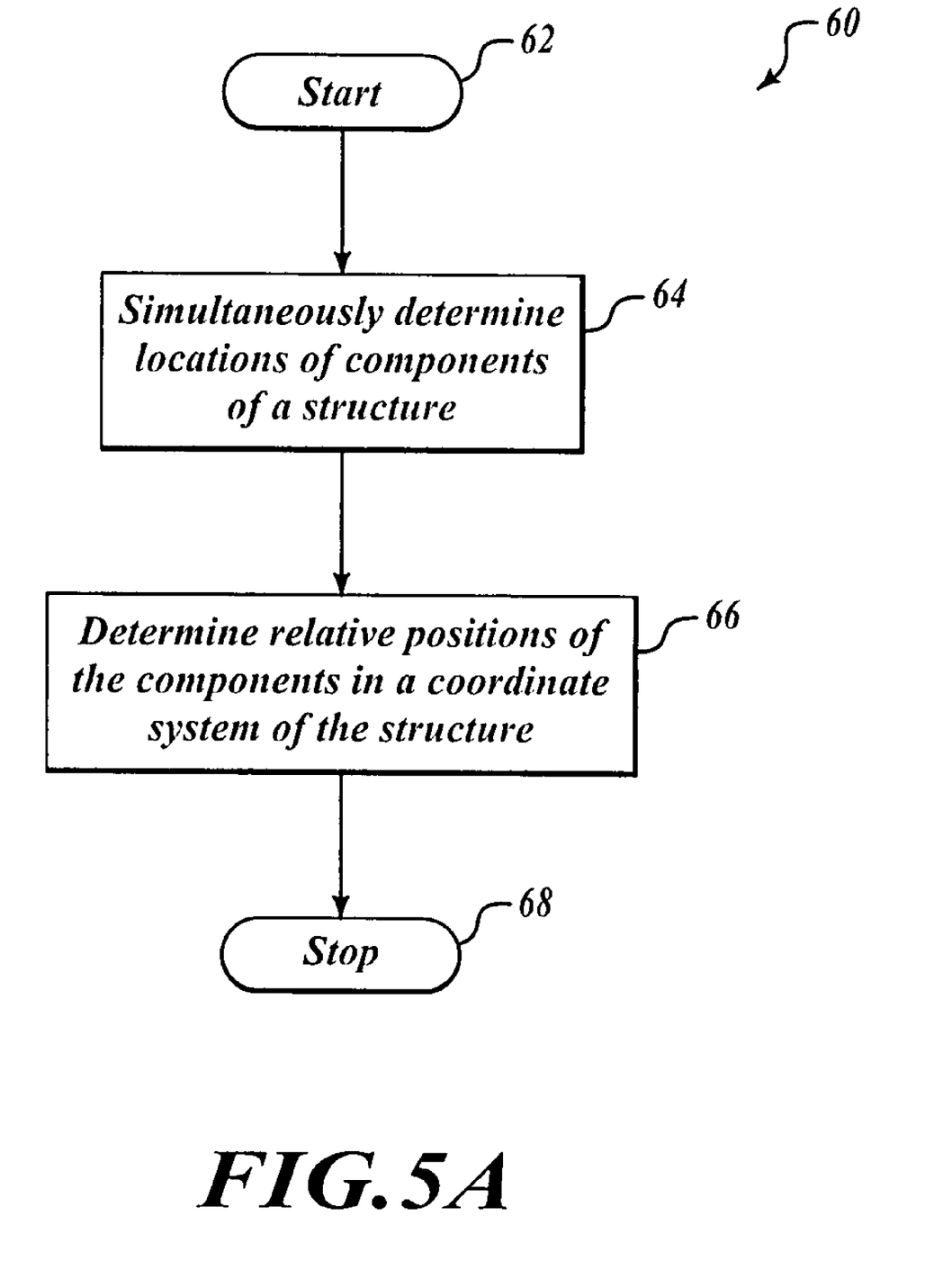
FIG. 5A is a flowchart of an illustrative method for locating components of a structure.
Figure 5B:
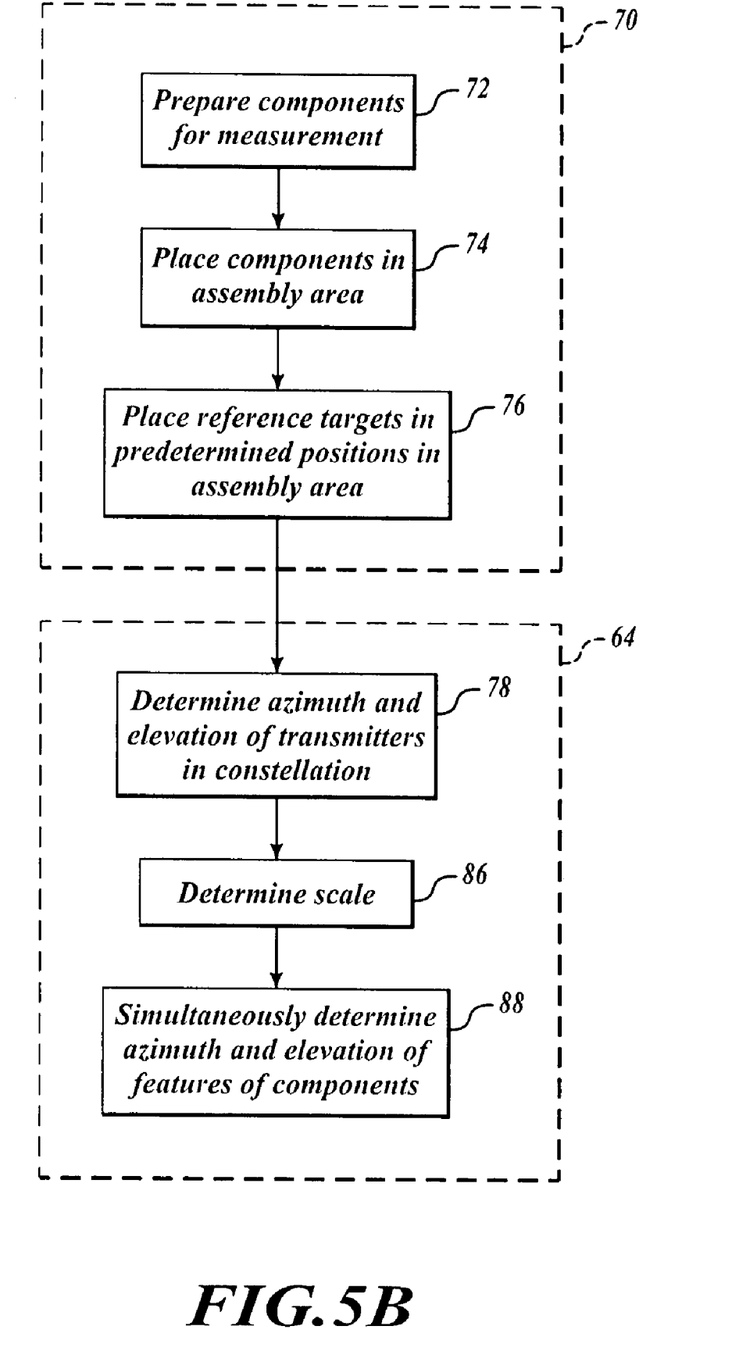
FIGS. 5B-5D are flowcharts of details of processing blocks of the method of FIG. 5A.

As shown in FIG. 5B, at a block 70 preparations are made for measurement. Within the block 70, at a block 72 the components 12 are prepared for measurement. The targets 18 are placed about the components 12 in predetermined locations as described above, such as by being placed in determinant assembly holes (or at positions with locations known from the determinate assembly holes). At a block 74, the components 12 that have been prepared according to the block 70 are placed in the assembly area 42. At a block 76 the reference targets 30 are placed in predetermined positions in the assembly area 42. The predetermined positions are known in the coordinate system of the assembly area 42.

Figure 5C:
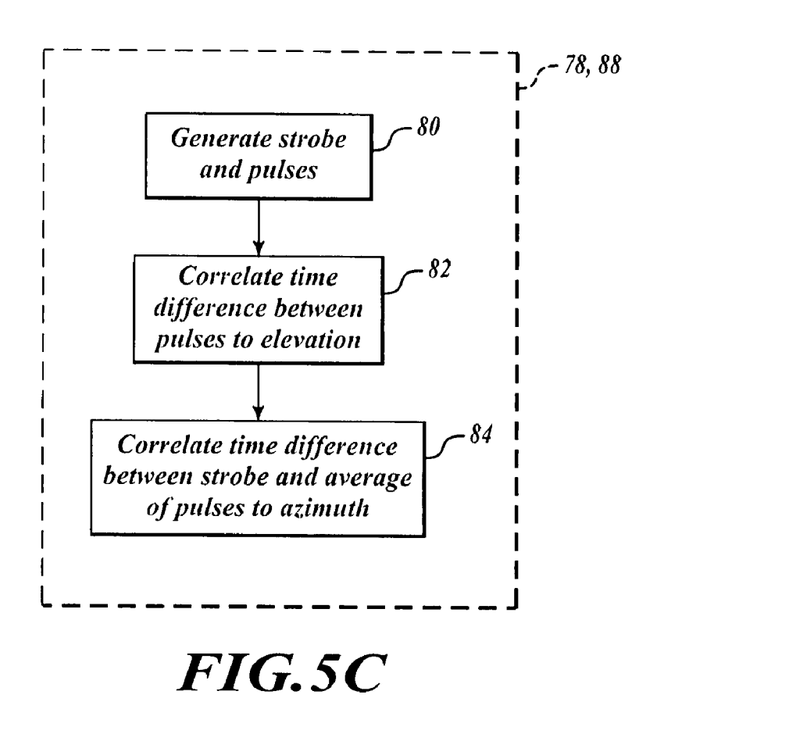

Several processes make up processing performed at the block 64. At a block 78, azimuth and elevation of transmitters in a constellation are determined. Referring additionally to FIG. 5C, at a block 80 the strobe 36, the pulse 38, and the pulse 40 are generated and the transmitters 24 transmit optical energy, in the form of the strobe 36, the pulse 38, the pulse 40, to the reference targets 30 that have been placed in predetermined positions that are known in the coordinate system of the assembly area 42. The transmitters 24 are swept in azimuth and elevation as the optical energy is transmitted. At a block 82, time differences between the pulses 38 and 40 are correlated to elevation as described above. At a block 84, time differences between the strobe 36 and an average of the pulses 38 and 40 are correlated to azimuth, as described above. The processors 50 convert timing of the strobe 36, the pulse 38, and the pulse 40 to azimuth and elevation of the transmitters 24.

Referring back to FIG. 5B, at a block 86, distance scale is determined. Because the reference targets 30 are spaced apart by known distances, a distance scale can be determined by triangulation of the reference targets 30. In other embodiments, distance scale can be determined with the transmitters 24 by triangulation of a distance standard detector assembly (not shown) that includes two detectors separated by known distance. Processing to determine the distance scale suitably is performed by the data processing system 22.

At a block 88 azimuth and elevation of all of the features 18 are determined simultaneously. Referring back to FIG. 5C, the same processing is performed (that is, the blocks 80, 82, and 84) by the processors 50 associated with the targets 18 to determine azimuth and elevation of the features 18 that is performed by the processors 50 associated with the reference detectors 30 to determine azimuth and elevation of the transmitters 24.

Figure 5D:
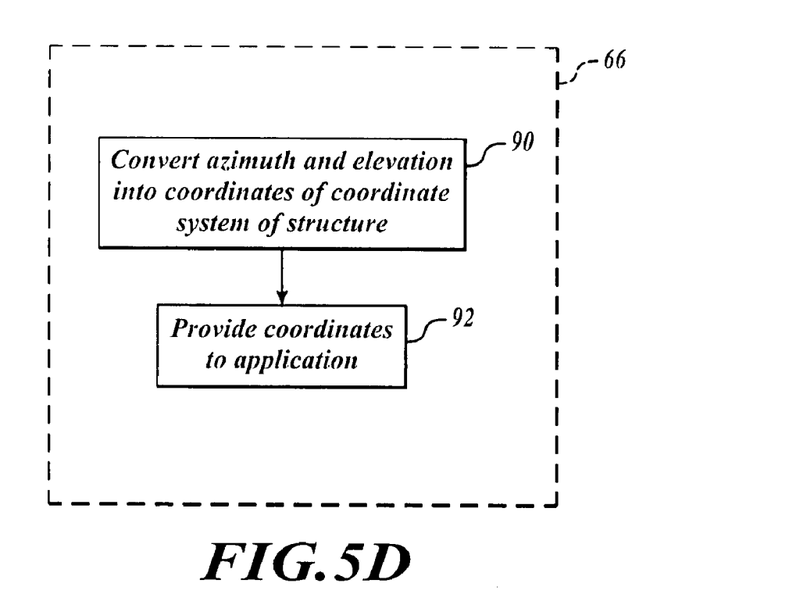

Referring now to FIGS. 5A and 5D, several processes make up processing performed at the block 66. At a block 90, azimuth and elevation are converted into coordinates of the coordinate system of the structure 14. The data processing system 22 transforms the coordinate system of the assembly area 42 into the coordinate system of the structure 14 using any suitable transform technique that is known in the metrology art. The data processing system 22 then converts azimuth and elevation into coordinates using techniques such as triangulation and/or trilateration. Because the coordinate system of the assembly area 42 had already been transformed to the coordinate system of the structure 14, the coordinates generated at the block 90 are in the coordinate system of the structure 14. At a block 92, if desired the coordinates are provided to applications as desired for the further processing.

No implication of ordering for carrying out the processing blocks is to be inferred from the non-limiting representations shown in FIGS. 5A-5D. For example, in some embodiments the targets 18 can be installed on the components 12 at the block 72 and the components 12 placed in the assembly area 42 at the block 74 before the reference targets 30 are placed in the assembly area at the block 76. However, in other embodiments the reference targets 30 can be placed in the assembly area at the block 76 before the targets 18 are installed on the components 12 at the block 72 and the components 12 placed in the assembly area 42 at the block 74. In yet other embodiments the blocks 72, 74, and 76 can be performed substantially simultaneously, if desired.

As another example, in some embodiments the same optical energy can be transmitted from the transmitters 24 to the reference targets 30 and to the targets 18. Thus, the reference detectors 30 and the targets 18 detect the same optical energy at substantially the same time. Therefore, the detector processing circuitry 46 associated with the reference targets 30 and the detector processing circuitry 46 associated with the targets 18 perform their processing at substantially the same time. That is, determination of the azimuth and elevation of the transmitters 24 at the block 78 occurs at substantially the same time, or substantially in parallel with, determination of the azimuth and elevation of the features 18 at the block 88.

However, in other embodiments separate optical energy can be transmitted from the transmitters 24 to the reference targets 30 and to the targets 18. Thus, the reference detectors 30 and the targets 18 detect different optical energy at different times. Therefore, the detector processing circuitry 46 associated with the reference targets 30 and the detector processing circuitry 46 associated with the targets 18 perform their processing at different times. That is, determination of the azimuth and elevation of the transmitters 24 at the block 78 occurs at a different time, or in series with, determination of the azimuth and elevation of the features 18 at the block 88. In some the block 78 may be performed before the 88, and in some other embodiments the block 88 may be performed before the 78.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for locating components of a structure, the method comprising:
   simultaneously determining locations of a plurality of features of a plurality of components of a structure;
   determining relative positions of the plurality of components in a coordinate system of the structure; and
   determining a distance scale of the coordinate system of the structure based on reference points at known positions of a coordinate system of an assembly area.

2. The method of claim 1, further comprising determining locations of a plurality of transmitters in a constellation of transmitters based on the reference points.

3. The method of claim 2, wherein determining locations of a plurality of transmitters includes determining azimuth and elevation of the plurality of transmitters relative to locations of a plurality of reference targets that are arranged in the assembly area at the reference points.

4. The method of claim 3, wherein simultaneously determining locations of a plurality of features of a plurality of components includes simultaneously determining azimuth and elevation of a plurality of component targets arranged in a plurality of predetermined positions on the plurality of components relative to the locations of the plurality of transmitters.

5. The method of claim 4, wherein determining relative positions of the components includes converting azimuth and elevation into coordinates in the coordinate system of the structure.

6. The method of claim 1, further comprising:
   preparing the plurality of components for measurement; and
   placing the plurality of components in the assembly area.

7. The method of claim 6, wherein preparing the plurality of components for measurement includes disposing a plurality of component targets about the plurality of components in a plurality of predetermined locations that are known in the coordinate system of the structure.

8. A method for locating components of a structure, the method comprising:
   determining locations of a plurality of transmitters in a constellation of transmitters relative to locations of a plurality of reference targets that are arranged in an assembly area in a plurality of predetermined positions that are known in a coordinate system of the assembly area;
   simultaneously determining locations of a plurality of features of a plurality of components of the structure relative to the locations of the plurality of transmitters; and
   determining relative positions of the plurality of components in a coordinate system of the structure.

9. The method of claim 8, wherein determining locations of a plurality of transmitters includes determining azimuth and elevation of the plurality of transmitters relative to locations of the plurality of reference targets.

10. The method of claim 9, wherein simultaneously determining locations of a plurality of features of a plurality of components includes simultaneously determining azimuth and elevation of a plurality of component targets arranged on the plurality of components in a plurality of predetermined positions that are known in the coordinate system of the structure relative to the locations of the plurality of transmitters.

11. The method of claim 10, wherein determining relative positions of the components includes converting azimuth and elevation into coordinates in the coordinate system of the structure.

12. A system for locating components of a structure, the system comprising:
   a measurement system to simultaneously determine locations of a plurality of features of a plurality of components of a structure that is disposed in tooling in an assembly area, and to determine locations of portions of the measurement system based on a plurality of reference points at known locations in a coordinate system of the assembly area, the measurement system being located separate from the tooling; and
   a data processing system to determine relative positions of the plurality of components in a coordinate system of the structure based on the locations of the plurality of features and the locations of the portions of the measurement system.

13. The system of claim 12, wherein the measurement system includes a plurality of transmitters arranged in a constellation.

14. The system of claim 13, wherein the measurement system further includes a plurality of component targets disposed about the plurality of components in a plurality of predetermined locations that are known in the coordinate system of the structure.

15. The system of claim 14, wherein the plurality of reference points includes a plurality of reference targets that are arranged in the assembly area at the known locations in the coordinate system of the assembly area.

16. The system of claim 15, wherein:
   the measurement system includes an infrared global positioning system;
   the plurality of transmitters includes a plurality of infrared transmitters; and
   the plurality of component targets and the plurality of reference targets include a plurality of infrared detectors.

17. The system of claim 15, wherein:
   the measurement system includes a photogrammetry system including a plurality of cameras;
   the plurality of transmitters includes a plurality of flash-emitting devices, each of the plurality of flash-emitting devices being co-located with an associated camera of the plurality of cameras;

the plurality of component targets and the plurality of reference targets include a plurality of passive reflectors.

18. The system of claim 15, wherein the data processing system includes a data processing unit including:
a first data processing component configured to determine azimuth and elevation of the plurality of transmitters relative to the locations of the plurality of reference targets; and
a second data processing component configured to determine azimuth and elevation of the plurality of component targets relative to the locations of the plurality of transmitters.

19. The system of claim 18, wherein data processing unit further includes a third data processing component configured to convert azimuth and elevation into coordinates in the coordinate system of the structure.

20. A manufacturing facility comprising:
an assembly area to receive for assembly a plurality of components of a structure, the assembly area having a coordinate system and a plurality of reference points at known positions within the coordinate system of the assembly area; and
a system for locating the plurality of components, the plurality of components being disposed in tooling, the system including:
a measurement system to simultaneously determine locations of a plurality of features of the plurality of components, the measurement system being located separate from the tooling; and
a data processing system to determine relative positions of the plurality of components in a coordinate system of the structure based on the locations of the plurality of features and the known positions of the reference points.

21. The manufacturing facility of claim 20, wherein the measurement system includes a plurality of transmitters arranged in a constellation.

22. The manufacturing facility of claim 21, wherein the measurement system further includes a plurality of component targets disposed about the plurality of components in a plurality of predetermined locations that are known in the coordinate system of the structure.

23. The manufacturing facility of claim 22, wherein the measurement system further includes a plurality of reference targets that are located at the reference points.

24. The manufacturing facility of claim 23, wherein:
the measurement system includes an infrared global positioning system; the plurality of transmitters includes a plurality of infrared transmitters; and
the plurality of component targets and the plurality of reference targets include a plurality of infrared detectors.

25. The manufacturing facility of claim 23, wherein:
the measurement system includes a photogrammetry system including a plurality of cameras;
the plurality of transmitters includes a plurality of flash-emitting devices, each of the plurality of flash-emitting devices being co-located with an associated camera of the plurality of cameras;
the plurality of component targets and the plurality of reference targets include a plurality of passive reflectors.

* * * * *